July 7, 1959     K. SCHLOTMANN ET AL     2,893,223
FLEXIBLE COUPLINGS
Filed Jan. 30, 1959
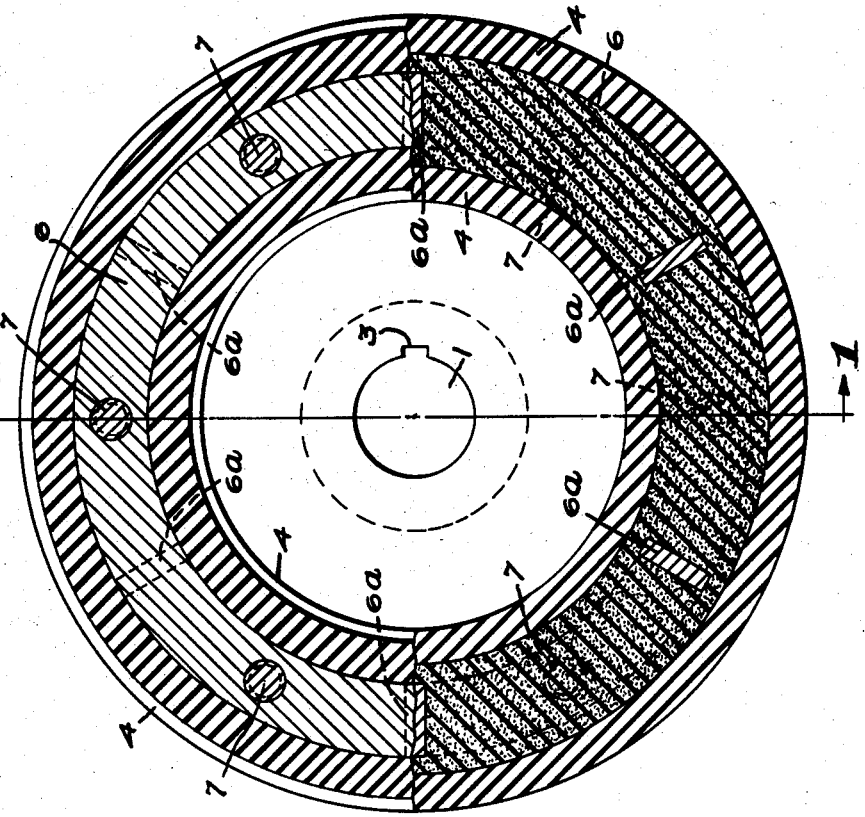
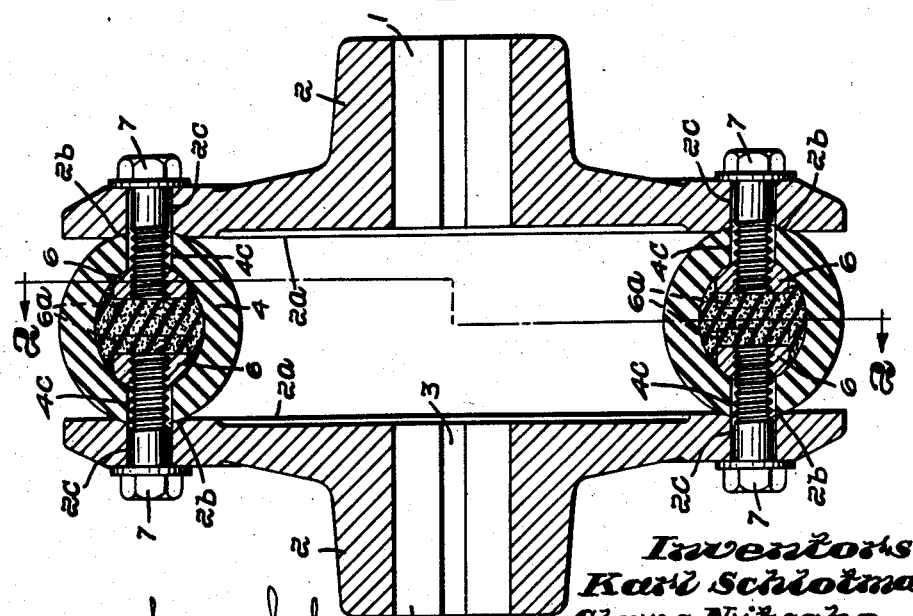
Inventors:
Karl Schlotmann,
Claus Nitsche,
Attorney

United States Patent Office 2,893,223
Patented July 7, 1959

2,893,223

FLEXIBLE COUPLINGS

Karl Schlotmann and Claus Nitsche, Unna, Germany, assignors to Maschinenfabrik Stromag G.m.b.H., Unna, Germany Application January 30, 1959, Serial No. 790,181

4 Claims. (Cl. 64—13)

This invention relates generally to flexible couplings as widely used for coupling driving shafts and driven shafts, and more particularly to flexible couplings comprising a hollow torque-transmitting member of rubber or a like elastomer.

It is a general object of this invention to improve flexible couplings of the aforementioned character.

Another object of this invention is to provide improved versions of the flexible couplings disclosed and claimed in United States Patent 2,648,958 to Karl Schlotmann, August 18, 1953, Flexible Couplings, and in United States Patent 2,816,424 to Fritz Vorthmann, December 17, 1957, Flexible Couplings.

Flexible couplings of the aforementioned character, including those disclosed and claimed in the two aforementioned patents are, to some extent, subject to mechanical vibrations.

It is, therefore, one object of this invention to provide flexible couplings of the aforementioned character having no tendency, or a substantially smaller tendency, to vibrate.

Another object of this invention is to provide flexible couplings of the aforementioned character having damping means which do not give rise to excessive centrifugal forces tending to damage the hollow torque-transmitting member and to subject the shafts which are coupled by the coupling to excessive bending stresses.

Still another object of this invention is to provide improved means for limiting relative angular movement of the two coupling members of a flexible coupling.

The novel features that we consider characteristic of the invention are set forth in particular in the appended claims. The invention itself, however, together with additional objects and advantages thereof, will best be understood from the following description of a specific embodiment of the invention when read in connection with the accompanying drawing, in which Fig. 1 is a section of a coupling embodying the invention taken along 1—1 of Fig. 2; and Fig. 2 is a section taken along 2—2 of Fig. 1.

Referring now to the drawing, numeral 1 has been applied to indicate a pair of coaxial shafts of which one is a driving shaft and the other a driven shaft. Each of shafts 1 supports a coupling member 2 fixedly mounted on the respective shaft as, for instance, by a key 3. The hollow torque-transmitting element 4 in the shape of an endless tube of an elastomer, e. g. vulcanized rubber of the kind used in the automotive industry for making inner tubes, is provided for transmitting torque from one side of the coupling to the other. The filler body 5 made of a relatively soft elastomer, e. g. solid rubber softer than the rubber of which tube 4 is made, is arranged inside of the tube 4 and fills substantially the space defined by tube 4. This filler body 5 is an excellent suppressor of vibrations without unduly increasing the flywheel action of the coupling, which would result in giving rise to undue stresses. Tube 4 and filler body 5 are arranged in coaxial relation with respect to shafts 1 in the space bounded by the flange portions 2a of coupling members 2. Each flange portion 2a is provided with a shallow circular groove or recess 2b into which tube 4 projects. Each of the flange portions 2a of coupling members 2 is further provided with a plurality of circularly arranged angularly displaced holes 2c of which each extends parallel to shafts 1. Holes 2c are at right angles to the planes or surfaces defined by flanges 2a. Tube 4 is provided with a plurality of holes 4c of which each is in registry with one of the holes 2c in flanges 2a. A pair of annular clamping members 6 is arranged inside of tube 4 each juxtaposed to one of the flanges or surfaces 2a of coupling members 2 and in engagement with the side of tube 4. Clamping members 6 may be provided with projections 6a substantially at right angles to the flanges or surfaces 2a of coupling members 2. Parts 6a project into filler body 5 and form abutments spaced by portions of filler body 5 and limiting jointly with these portions 5 relative angular movement of coupling members 2. The portions of filler body 5 which are situated between contiguous projections 6a form effective buffers and may be compressed under the action of the torque imparted to the driving portion of the coupling thus, as mentioned above, limiting relative angular movement between the driving portion and the driven portion of the coupling. The coupling further comprises a plurality of studs 7 of which each extends through one of holes 2c and one of holes 4c into one of clamping members 6 for clamping said member against tube 4 and against flanges or surfaces 2a.

It will be apparent from the foregoing that the improvement of our invention over the structure described and claimed in the aforementioned Vorthmann patent is due to the presence of the relatively soft filler body 5 in tube 4.

While we have described and illustrated a coupling having a pair of flanges 2a at right angles to the shafts 1 to be coupled, this invention is not limited to this type of couplings. It may also be applied to couplings comprising flanges which are substantially cylindrical coaxial surfaces. This type of couplings has been shown in the aforementioned Vorthmann patent to which reference may be had for a more complete disclosure of this type of couplings.

The filler body 5 may be loosely arranged inside of tube 4, or it may be integrated with tube 4—as by vulcanising—to form jointly with tube 4 an inseparable unit.

Tube 4 may either be formed of two separate layers, as shown in the aforementioned Vorthmann patent, or it may be formed by one single layer, as shown in Figs. 1 and 2. The process of manufacturing single layer tubes as shown in Figs. 1 and 2 comprises the steps of forming two complementary tube portions each hollow and semicircular in cross-section, of inserting and vulcanizing one clamping member 6 to, and of inserting the filler body 5 into, one of said complementary tube portions, of vulcanizing a clamping member 6 to the other of said complementary tube portions, and of bonding both tube portions together to form a unitary single layer tube by applying a self-vulcanizing adhesive to the seam formed between the two tube portions.

It will be understood that this invention is not limited to couplings wherein each coupling member 2 is provided with one single annular clamping member 6. If desired each clamping member or ring 6 may be replaced by a plurality of individual angularly displaced clamping members jointly forming an annular pattern. This has been more fully explained in the aforementioned Vorthmann patent and reference may be had to this patent for this particular modification of the kind of couplings with which the invention is concerned.

Having described a preferred embodiment of our invention in accordance with the patent statutes, it is to be understood that various changes and modifications may be made in the particular embodiment disclosed without departing from the essential features of the invention. It is, therefore, desired that the invention be interpreted as broadly as possible in view of the prior art, and that it be limited only by what is expressly stated in the following claims.

We claim as our invention:

1. A flexible coupling comprising in combination a pair of coaxial shafts, a pair of spaced coupling members each including a flange portion and each fixedly mounted on one of said pair of shafts, a hollow torque-transmitting element in the shape of an endless tube of an elastomer arranged in coaxial relation with respect to said pair of shafts within the space bounded by said flange portion of each of said pair of coupling members, a first clamping means arranged inside said tube engaging the inner lateral wall thereof juxtaposed to said flange portion of one of said pair of coupling members, a second clamping means arranged inside said tube engaging the inner wall thereof juxtaposed to said flange portion of the other of said pair of coupling members, a first plurality of angularly displaced studs projecting transversely across said flange portion of said one of said pair of coupling members and said lateral wall of said tube into the inside of said tube and cooperating with said first clamping means to clamp said tube to said one of said pair of coupling members, a second plurality of angularly displaced studs projecting transversely across said flange portion of said other of said pair of coupling members and said lateral wall of said tube into the inside of said tube and cooperating with said second clamping means to clamp said tube to said other of said pair of coupling members, and a filler body of an elastomer softer than the elastomer of which said tube is made arranged inside of said tube and filling the space defined by said tube.

2. A flexible coupling as defined in claim 1 wherein said filler body is loosely arranged inside of said tube.

3. A flexible coupling as defined in claim 1 wherein said filler body is integrated with said tube to form an inseparable unit.

4. A flexible coupling comprising in combination a pair of separate coaxial shafts, a pair of coupling members each fixedly mounted on one of said pair of shafts, a pair of spaced parallel surfaces each forming an integral part of one of said pair of coupling members, a plurality of circularly arranged angularly displaced holes in each of said pair of coupling members each extending at right angles to said parallel surfaces, a hollow torque-transmitting element in the shape of an endless tube of an elastomer arranged between said pair of surfaces in coaxial relation to said pair of shafts and engaging said pair of surfaces, a filler body of an elastomer softer than the elastomer of which said tube is made arranged inside of said tube and filling the space defined by said tube, a plurality of holes in said tube each in registry with one of said plurality of holes in said pair of coupling members, a pair of clamping members arranged inside of said tube juxtaposed to said pair of surfaces and in engagement with the inside of said tube, each of said pair of clamping members including portions projecting therefrom at substantially right angles and forming abutments limiting relative angular movement of said pair of coupling members, and a plurality of studs associated with said pair of clamping members, each of said plurality of studs extending through one of said plurality of holes in said pair of coupling members and through one of said plurality of holes in said tube for clamping said tube against said pair of surfaces.

References Cited in the file of this patent

UNITED STATES PATENTS

| | | |
|---|---|---|
| 1,691,190 | Hatfield | Nov. 13, 1928 |
| 1,760,852 | Short | May 27, 1930 |
| 2,816,424 | Vorthmann | Dec. 17, 1957 |